(12) United States Patent
Isogai et al.

(10) Patent No.: US 6,768,291 B2
(45) Date of Patent: Jul. 27, 2004

(54) FLUID FLOW SENSOR AND METHOD OF FABRICATING THE SAME

(75) Inventors: Toshiki Isogai, Nagoya (JP); Yasushi Kohno, Nagoya (JP); Toshimasa Yamamoto, Bisai (JP); Hiroyuki Wado, Toyota (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/107,443

(22) Filed: Mar. 28, 2002

(65) Prior Publication Data

US 2002/0148289 A1 Oct. 17, 2002

(30) Foreign Application Priority Data

Mar. 30, 2001 (JP) ........................................ 2001-101593
Dec. 10, 2001 (JP) ........................................ 2001-376176

(51) Int. Cl.[7] ............................. G01N 27/00; G01F 1/68
(52) U.S. Cl. ................. 324/71.1; 73/861.08; 73/204.22
(58) Field of Search ............................... 324/71.1, 464, 324/450, 453, 722, 693, 695; 73/204.22, 204.26, 861.08, 204.23; 205/785.5

(56) References Cited

U.S. PATENT DOCUMENTS

| | | | | |
|---|---|---|---|---|
| 4,548,078 A | * | 10/1985 | Bohrer et al. | ............ 73/204.22 |
| 5,198,773 A | * | 3/1993 | Latta | ........................... 324/464 |
| 5,404,753 A | | 4/1995 | Hecht et al. | |
| 5,591,321 A | * | 1/1997 | Pyke | ........................... 205/787 |
| 6,300,753 B1 | * | 10/2001 | Walde et al. | ............... 324/71.1 |

* cited by examiner

Primary Examiner—Anjan K. Deb
(74) Attorney, Agent, or Firm—Nixon & Vanderhye PC

(57) ABSTRACT

In a sensor chip for a fluid flow sensor, a thin film portion is formed above a hollow cavity portion while leaving thin film layers formed on the surface of a substrate. A conductor is provided on the inner wall face of a through hole formed to penetrate the substrate to thereby electrically connect a detecting portion constituted by a conductor film in the thin film layers and a substrate conductor portion formed on the rear face side of the through hole. The surface of a circuit board is formed with a control circuit and a base conductor portion electrically connected to the control circuit. The sensor chip and the circuit board are layered and the substrate conductor portion and the base conductor portion are electrically connected.

4 Claims, 14 Drawing Sheets

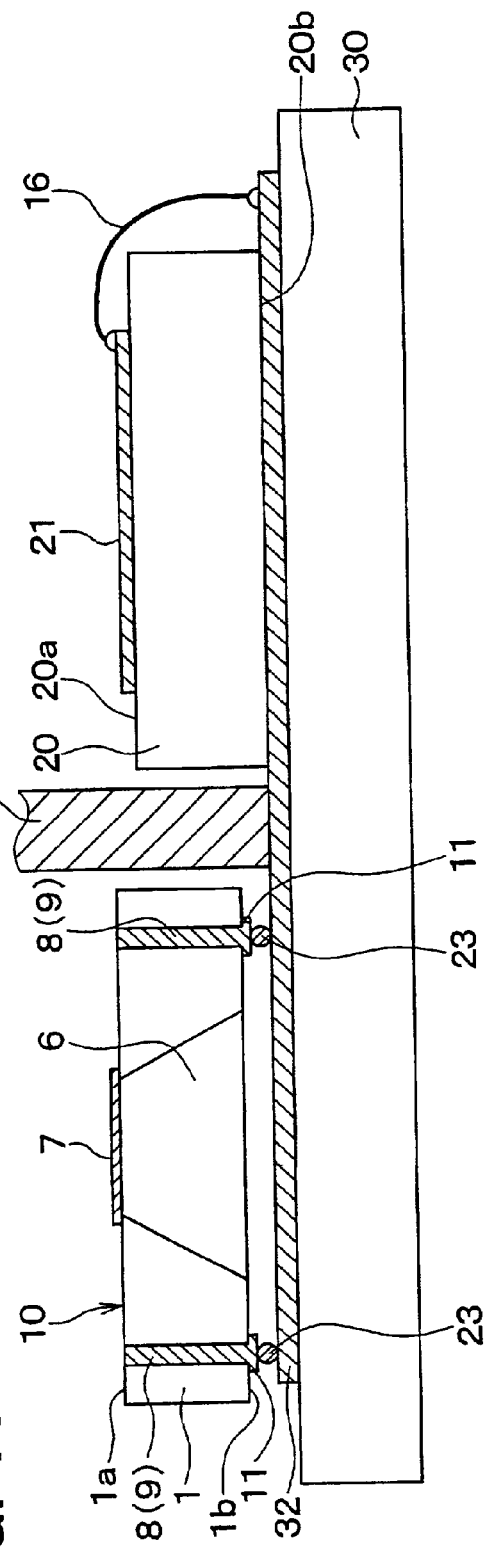
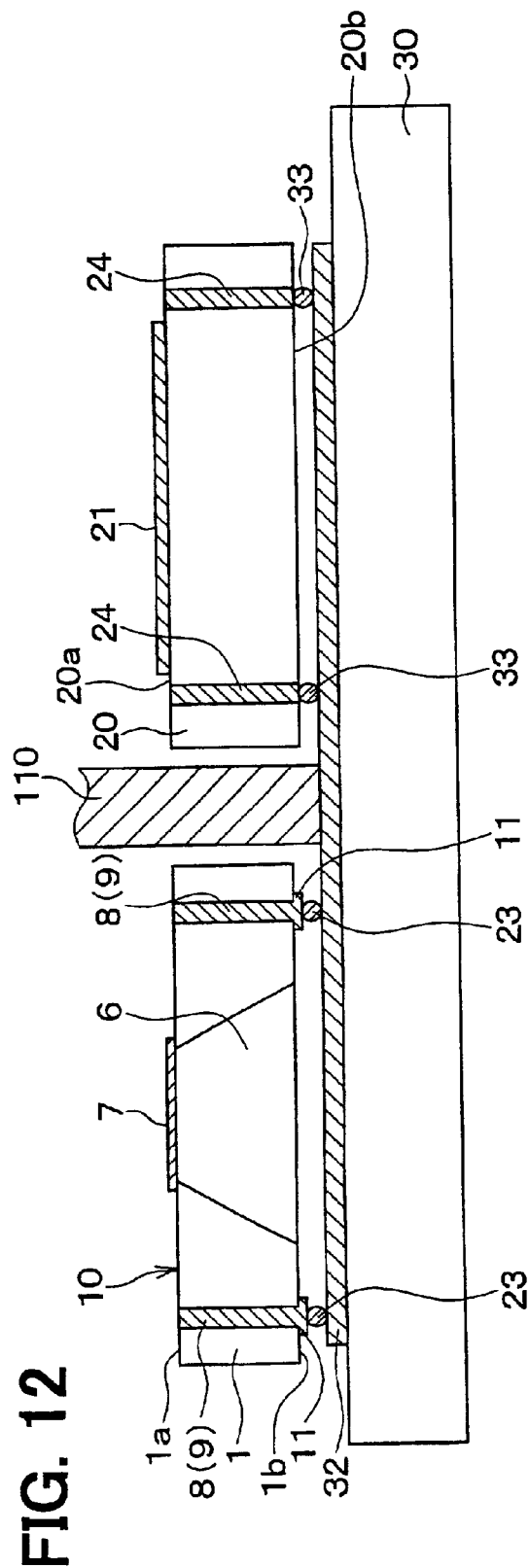

FLUID FLOW SENSOR AND METHOD OF FABRICATING THE SAME

CROSS REFERENCE TO RELATED APPLICATION

This application is based on and incorporates herein by reference Japanese Patent Applications No. 2001-101593 filed Mar. 30, 2001 and No. 2001-376176 filed Dec. 10, 2001.

FIELD OF THE INVENTION

The present invention relates to a fluid flow sensor and a method of fabricating the same fabricated by a semiconductor process.

BACKGROUND OF THE INVENTION

One type of a conventional thermal fluid flow sensor for use in detecting flow amount of air is disclosed in U.S. Pat. No. 5,404,753 (JP-A-6-50783). In this thermal fluid flow sensor, a thin film semiconductor flow detecting part and a bonding pad (conductor part) are provided on the same plane and separated from each other by a separation wall. As a result, it is not possible to reduce the planar size of the fluid flow sensor.

SUMMARY OF THE INVENTION

It is an object of the invention to provide a fluid flow sensor capable of reducing its planar size and a method of fabricating the same.

In one of preferred embodiments, a fluid flow sensor comprises a fluid flow sensor chip that includes a board and detecting portions formed on a first surface of the board for detecting a flow rate of fluid flowing above the first surface of the board. The fluid flow sensor chip further includes a substrate conductor portion electrically connected to the detecting portions and formed on a surface other than the first surface.

In fabricating the fluid flow sensor, thin film layers are formed above the first surface of the board, and a hollow cavity portion is formed by etching the board from the side of a second surface of the board opposite the first surface. A through hole is formed in the board where the hollow cavity portion is not formed. A conductor is formed on an inner wall face of the through hole to form a substrate conductor portion on the side of the second surface of the board.

BRIEF DESCRIPTION OF THE DRAWINGS

The above and other objects, features and advantages of the present invention will become more apparent from the following detailed description made with reference to the accompanying drawings. In the drawings:

FIG. 11 is a sectional view showing a fluid flow sensor according to a seventh embodiment of the present invention;

FIG. 12 is a sectional view showing a fluid flow sensor according to a modification of the seventh embodiment;

DETAILED DESCRIPTION OF THE PREFERRED EMBODIMENTS

Figure 1:
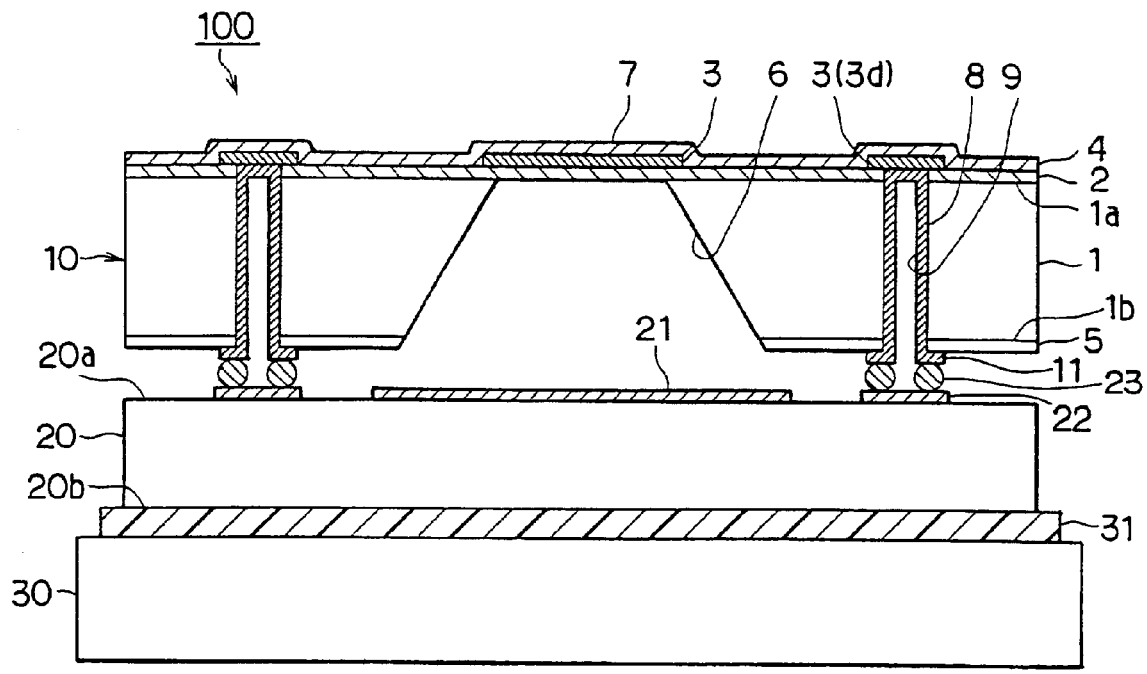
FIG. 1 is a sectional view showing a fluid flow sensor according to a first embodiment of the present invention.

The present invention will be described in detail with reference to various embodiments, in which the same or similar reference numerals are used to designate the same or similar parts.

(First Embodiment)

Referring to FIG. 1, a fluid flow sensor 100 according to the first embodiment is constructed with a fluid flow sensor chip 10, which is electrically connected to a circuit board 20 constituting a base having a control circuit. The circuit board 20 is fixed to a base board 30. This fluid flow sensor 100 may be provided in an intake air passage of an internal combustion engine for measuring intake air flow to the engine.

In the sensor chip 10, a lower film 2 comprising an insulating film is formed on a surface 1a of a substrate 1. A conductor film 3 is formed on the lower film 2, and an upper film 4 comprising an insulating film is formed on the lower film 2 and the conductor film 3. Thus, a thin film layer is constituted by combining the lower film 2, the conductor film 3 and the upper film 4. Specifically, the lower film 2 is layered with a nitride film and an oxide film in this order from the side of the substrate 1. A platinum (Pt) film is used for the conductor film 3. The upper film 4 is layered with an oxide film and a nitride film.

An insulating film 5, which is an oxide film or the like, is formed on the side of a rear face 1b of the substrate 1 opposed to the surface 1a. A hollow cavity portion 6 is formed from an opening portion of the insulating film 5, while leaving the thin film layers 2 through 4. Further, the thin film layers 2 through 4 above the hollow cavity portion 6 constitute a thin film portion 7.

Figure 2:
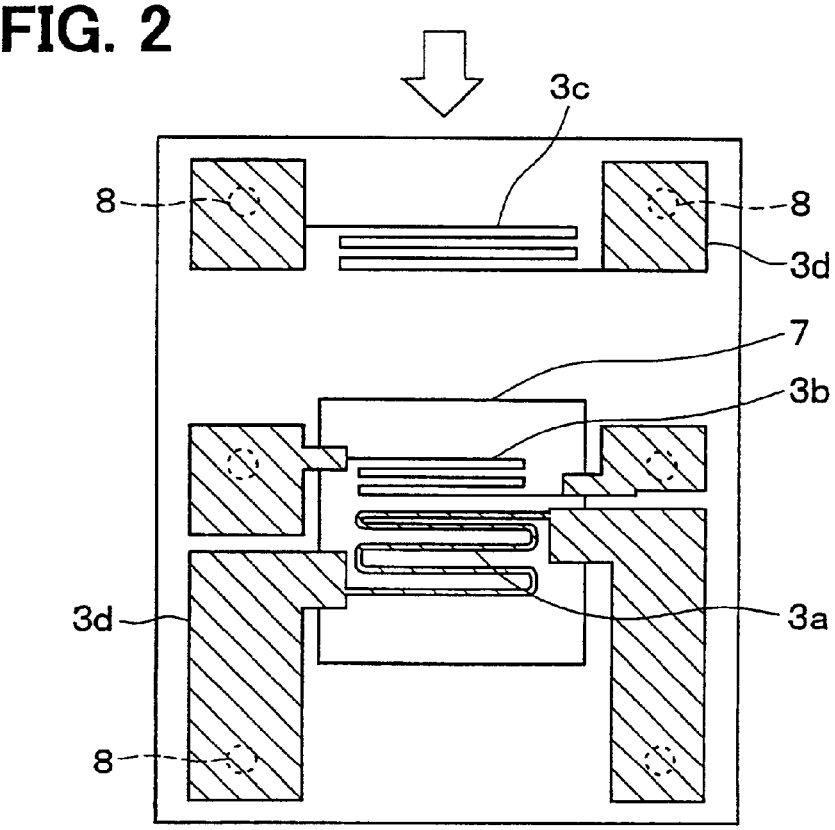
FIG. 2 is a top view showing the fluid flow sensor according to the first embodiment.

As shown in FIG. 2, there are constituted a heater 3a, a temperature measuring body 3b, a fluid thermometer 3c and an electrode lead-out portion 3d. In this figure, a normal fluid flow direction is indicated by an arrow. Each of these is formed respectively in the meandering shape by the conductor film 3 in the thin film layers 2 through 4. Among them, the heater 3a, the temperature measuring body 3b and the fluid thermometer 3c correspond to a detecting portion for detecting a flow rate of a fluid. The heater 3a and the temperature measuring body 3b are arranged at the thin film portion 7. The heater 3a, the temperature measuring body 3b and the fluid thermometer 3c are aligned in this order. The electrode lead-out portion 3d is electrically connected to the heater 3a, the temperature measuring body 3b and the fluid thermometer 3c, respectively, and is extended to an end portion of the surface 1a of the substrate 1.

There are formed through holes 8 penetrating the surface and the rear face 1a and 1b of the substrate 1 at portions of the substrate 1 corresponding to end portions of the electrode lead-out portions 3d. Specifically, the through hole 8 constitutes a hole opened at a side of the rear face 1b of the substrate 1 and reaching the conductor film (electrode lead-out portion 3d) 3 on a side of the surface 1a of the substrate 1. A conductor 9 is provided on the inner wall face of the through hole 8 and is electrically connected to the conductor film 3 at the surface 1a of the substrate 1.

In the vicinity of the opening portion of the through hole 8 in the rear face 1b of the substrate 1, a substrate conductor portion 11 is formed to be exposed from the side of the rear face 1b of the substrate 1. The substrate conductor portions 11 are connected to the conductors 9 at insides of the through holes 8. As a result, the substrate conductor portions 11 are electrically connected to detecting portions 3a through 3c via the conductors 9. That is, at a face of an outer surface of the substrate 1 other than the surface 1a (rear face 1b), there are formed the substrate conductor portions 11 electrically connected to the detecting portions 3a through 3c.

In the fluid flow sensor 100, a control circuit 21 for controlling the detecting portions 3a through 3c is formed at a surface 20a of the circuit board 20. Further, a base conductor portion 22 electrically connected to the control circuit 21 is formed at the surface 20a of the circuit board 20.

The sensor chip 10 is layered on the circuit board 20 by arranging the side of the surface 20a of the circuit board 20 in opposition to the side of the rear face 1b of the substrate 1 of the sensor chip 10 such that the surface 1a of the substrate 1 of the sensor chip 10 and the control circuit 21 are prevented from being arranged on the same plane. The base conductor portion 22 and the substrate conductor portion 11 are electrically connected by a bump 23. The bump 23 is a member having conductivity, having adhesive force and having strength as a structure. Specifically, the bump 23 comprising gold or the like can be used.

As a result, the control circuit 21 and the detecting portions 3a through 3c of the substrate 1 are electrically connected via the conductor 9 of the through hole 8, the substrate conductor portion 11 and the base conductor portion 22. Further, a gap is formed between the sensor chip 10 and the circuit board 20 by the bump 23.

The rear face 20b of the circuit board 20 is fixed to the base board 30. Specifically, the rear face 20b of the circuit board 20 is attached to the base board 30 by an adhesive member 31 of epoxy resin or the like. A casing or the like for containing the fluid flow sensor 100 can be used as the base board 30.

Next, the method of fabricating the fluid flow sensor 100 will be described in reference to FIGS. 3A through 3E, which are sectional views showing a method of forming the through hole 8. The substrate 1 is prepared. After forming the lower film 2 on the surface 1a of the substrate 1, the conductor film 3 is formed and the conductor film 3 is patterned to thereby form the heater 3a, the temperature measuring body 3b, the fluid thermometer 3c and the electrode lead-out portion 3d. Thereafter, the upper film 4 is formed on the conductor film 3 (step of forming thin film layers).

Successively, the hollow cavity portion 6 is formed by etching the substrate 1 until the thin film layers 2 through 4 are exposed, from the side of the rear face 1b of the substrate 1 with the insulating film 5 formed on the side of the rear face 1b of the substrate 1 as a mask. As a result, the thin film portion 7 is formed on the hollow cavity portion 6 (step of forming thin film portions).

Figure 3A:
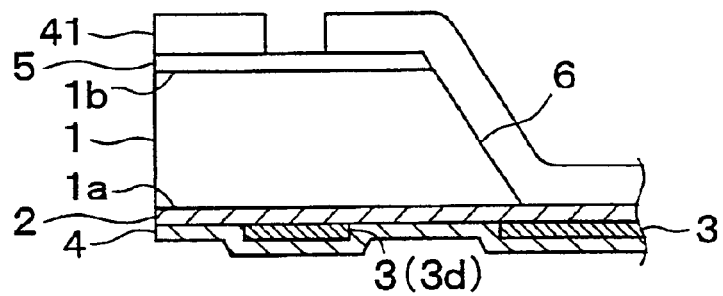
FIG. 3A through FIG. 3E are sectional views showing a part of a method of fabricating the fluid flow sensor according to the first embodiment.
Figure 3B:
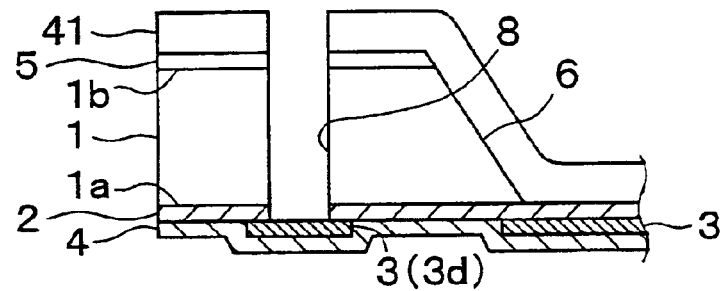
Figure 3C:
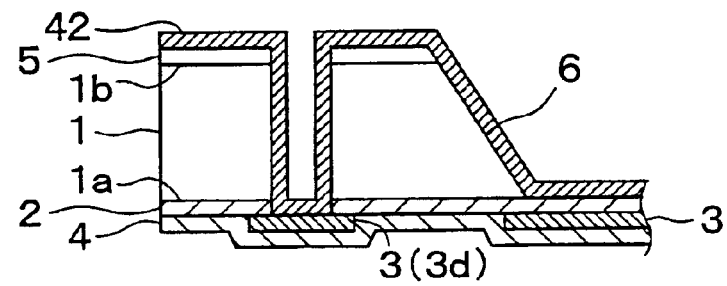

Thereafter, as shown in FIG. 3A, a resist 41 is formed to open only at a portion to be formed with the through hole 8 on the side of the rear face 1b of the substrate 1. As shown in FIG. 3B, the through hole 8 is formed by carrying out etching operation until the conductor film 3 in the thin film layers 2 through 4 is exposed with the resist 41 as a mask (step of forming through hole). After successively removing the resist 41, as shown in FIG. 3C, a conductor 42 is coated on the inner wall face of the through hole 8 and the rear face of the substrate 1.

Figure 3D:
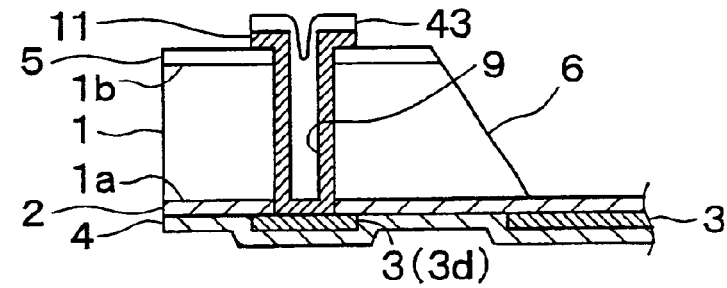

As shown in FIG. 3D, a resist 43 is formed at an inner portion of the through hole 8 and a surface of the portion for constituting the substrate conductor portion 11. By carrying out etching operation, the conductor 42 at a portion which is not covered by the resist 43 is removed. Thereafter, the resist 43 is removed. As described above, steps explained in reference to FIG. 3C and FIG. 3D are steps of forming the substrate conductor portion.

Figure 3E:
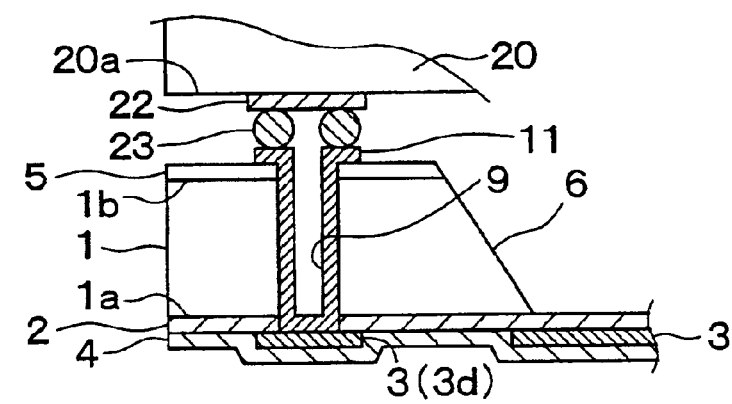

The circuit board 20 formed with the control circuit 21 and the base conductor portion 22 at the surface 20a is prepared and as shown in FIG. 3E. The substrate conductor portion 11 and the base conductor portion 22 are electrically connected via the bump 23. Thereafter, the base board 30 is prepared and the side of the rear face 20b of the circuit board 20 is fixed to the base board 30 by the adhesive member 31.

According to the fluid flow sensor 100, the heater 3a is driven to provide temperature higher than fluid temperature detected by the fluid thermometer 3c. When the fluid is made to flow from the fluid thermometer 3c toward the heater 3a by flowing above the detecting portions 3a through 3c, the temperature measuring body 3b is deprived of heat and its temperature is lowered. When the fluid is made to flow from the heater 3a toward the fluid thermometer 3c, heat is conveyed to the temperature measuring body 3b and its temperature is elevated. Therefore, a flow rate and a flow direction of the fluid can be detected by outputting a temperature difference between the temperature measuring body 3b and the fluid thermometer 3c from the electrode lead-out portion 3d as a change in voltage or the like. The detecting portions 3a through 3c are controlled mainly by the control circuit 21 in the known manner.

According to this embodiment, the though hole 8 is formed at the sensor chip 10 and the conductor 9 is provided on the inner wall face of the through hole 8. Therefore, transmission and reception of electric signals between the detecting portions 3a through 3c and the control circuit 21 can be carried out on the side of the rear face 1b of the substrate 1. Therefore, it is not necessary to provide an electric connecting portion between the detecting portions 3a through 3c and the control circuit 21 on the surface 1a of the substrate 1 in the sensor chip 10. Therefore, it is not necessary to protect the connecting portion against the fluid. The control circuit 21 is not arranged on the same plane as that of the surface of the sensor chip 10. Therefore, the control circuit 21 is not exposed to the fluid flowing above the detecting portions 3a through 3c, and it is not likely that the control circuit 21 is damaged by the fluid.

As a result, it is not necessary to arrange a partition wall for protecting the connecting portion and the control circuit 21 above the surface 1a of the substrate 1. Therefore, there need not be provided an area of arranging the partition wall nor an area between the detecting portions 3a through 3c and the partition wall which is needed in order to restrain disturbance of flow of the fluid when the partition wall is arranged. Therefore, the planar size of the sensor chip 10 can be reduced.

A gap is provided between the sensor chip 10 and the circuit board 20, outside of the fluid flow sensor 100 and the hollow cavity portion 6 are communicated with each other. Therefore, the thin film portion 7 can be restrained from being destructed by reducing pressure difference between the surface and the rear face of the thin film portion 7 when the fluid flows above the thin film portion 7.

The substrate conductor portion 11 and the base conductor portion 22 may electrically be connected by silver paste.

(Second Embodiment)

Figure 4:
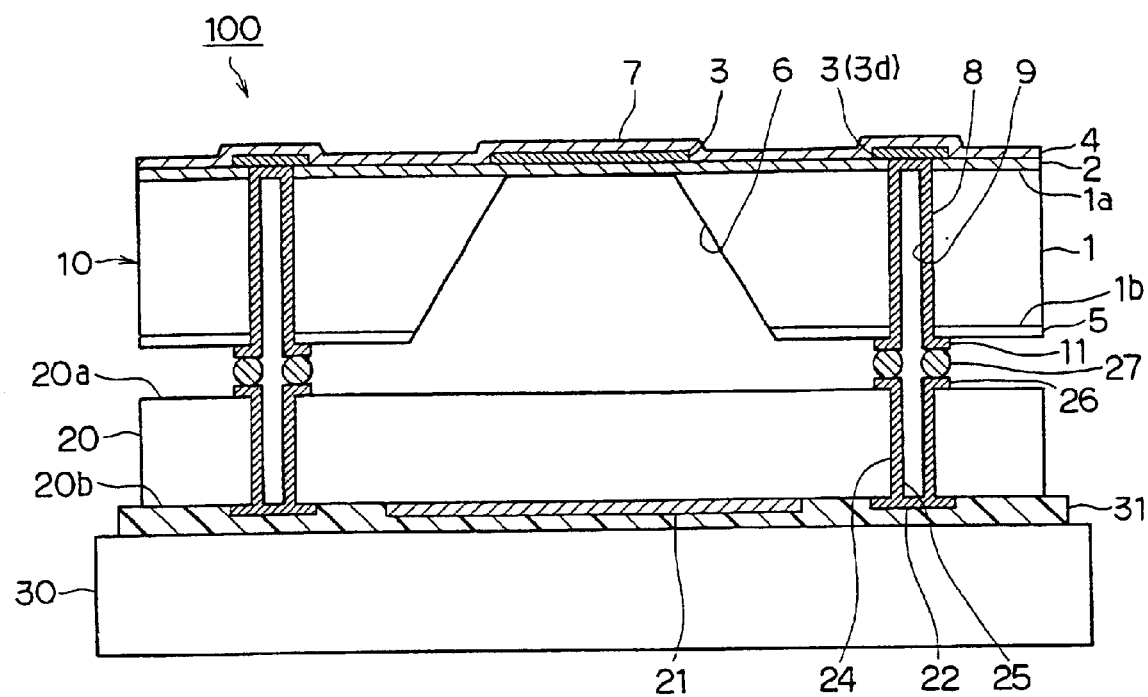
FIG. 4 is a sectional view showing a fluid flow sensor according to a second embodiment of the present invention.

In the second embodiment shown in FIG. 4, the control circuit 21 is formed on the side of the rear face 20b of the circuit board 20.

As shown in FIG. 4, the control circuit 21 is formed on the side of the rear face 20b of the circuit board 20. A through hole 24 is formed to penetrate from the side of the surface 20a to the side of the rear face 20b at the circuit board 20. The through hole 24 is provided at a position corresponding to the through hole 8 of the sensor chip 10. A conductor 25 is provided on an inner wall face of the through hole 24, and is electrically connected to a base conductor portion 22 provided on the side of the rear face 20b of the circuit board 20. A surface conductor portion 26 is exposed from the circuit board 20 at an opening portion of the through hole 24 also on the side of the surface 20a of the circuit board 20. The surface conductor portion 26 is electrically connected to the conductor 25 at the inside of the through hole 24.

The side of the surface 20a of the circuit board 20 is layered to be arranged in opposition to the side of the rear face of the sensor chip 10. The substrate conductor portion 11 and the surface conductor portion 26 of the circuit board 20 are electrically connected by a gold bump 27 or the like. The side of the rear face 20b of the circuit board 20 is attached to the base board 30 of a casing or the like of the fluid flow sensor via the adhesive member 31 of the epoxy resin or the like.

According to this second embodiment, not only the circuit board 20 can be fixed to the base board 30 but also the control circuit 21 can be protected against a surrounding environment by molding the control circuit 21 by the adhesive member 31. Since the control circuit 21 can be protected without particularly adding a step of protecting the control circuit 21, the steps can be made efficient. Other than these, advantages similar to that of the first embodiment can be achieved.

(Third Embodiment)

Figure 5:
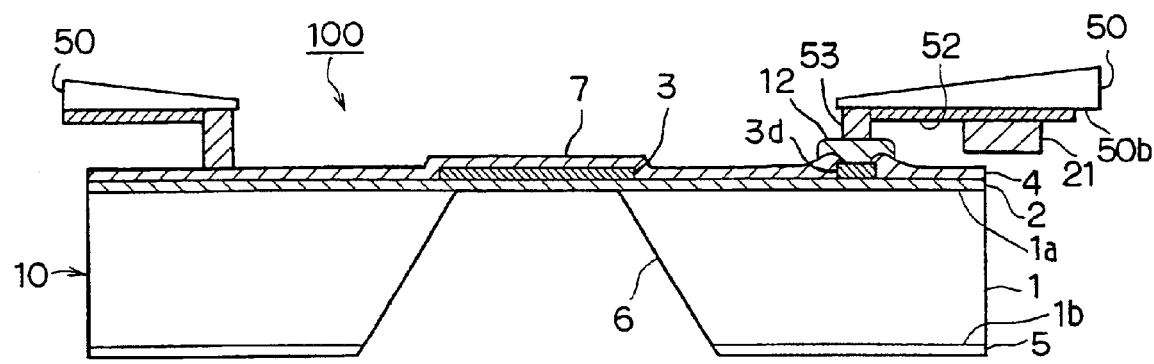
FIG. 5 is a sectional view showing a fluid flow sensor according to a third embodiment of the present invention.

In the third embodiment shown in FIG. 5, a pad 12 is exposed to the side of the surface of the sensor chip 10 at an end portion of the electrode lead-out portion 3d connected to the detecting portions 3a through 3c of the sensor chip 10. An intermediary board 50 constituting an intermediary member is arranged above the surface of the sensor chip 10.

Figure 6:
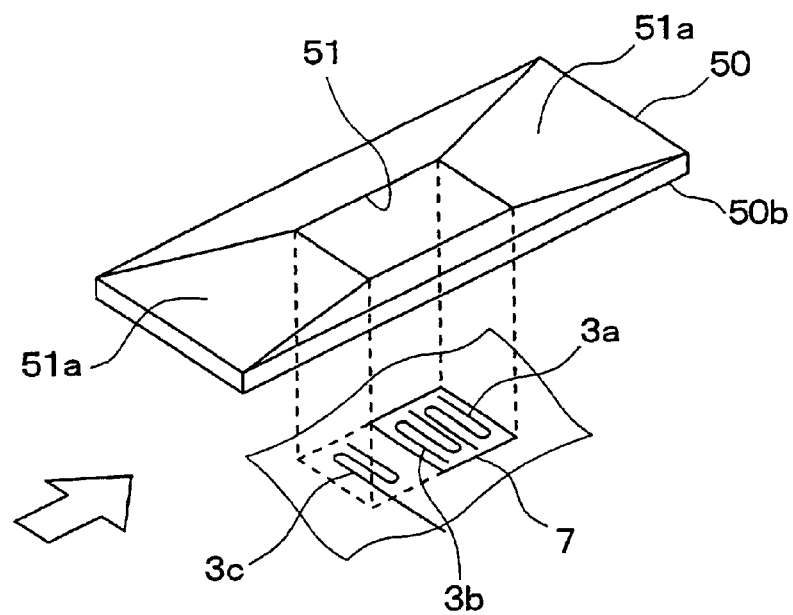
FIG. 6 is a perspective view schematically showing the fluid flow sensor according to the third embodiment.

FIG. 6 shows a perspective view of the intermediary board 50. The intermediary board 50 is formed with an opening portion 51 having a size smaller than a planar shape of the substrate 1 of the sensor chip 10 and equal to or larger than an area corresponding to the detecting portions 3a through 3c. The opening portion 51 is constituted such that a face 51a in side wall faces of the opening portion 51 disposed in a flow direction of the fluid and deepened toward the center of the opening portion 51.

By constituting the opening portion 51 in such a shape, the fluid is made to flow smoothly above the detecting portions 3a through 3c. The intermediary board 50 is arranged above the surface 1a of the substrate 1 such that the heater 3a, the temperature measuring body 3b and the fluid thermometer 3c constituting the detecting portion are exposed from the opening portion 51 of the intermediary member 50.

An intermediary member conductor portion 52 is formed at the rear face 50b which is opposed to the surface 1a of the substrate 1 of the sensor chip 10. The control circuit 21 is formed at the rear face 50b of the intermediary board 50, and the intermediary member conductor portion 52 and the control circuit 21 are electrically connected. The pad 12 of the substrate 1 and the intermediary member conductor portion 52 are electrically connected by a bump 53 or the like.

According to this embodiment, since the intermediary board 50 is used, connecting portions of the detecting portions 3a through 3c and outside of the sensor chip 10 (control circuit 21 or the like) and the control circuit 21 can be prevented from being exposed to the fluid flowing above the detecting portions 3a through 3c. Therefore, the planar size of the sensor chip 10 can be reduced. The intermediary board 50 is not as high as a partition wall, and therefore the intermediary board 50 does not affect significant influence on the flow of the fluid.

(Fourth Embodiment)

Figure 7:
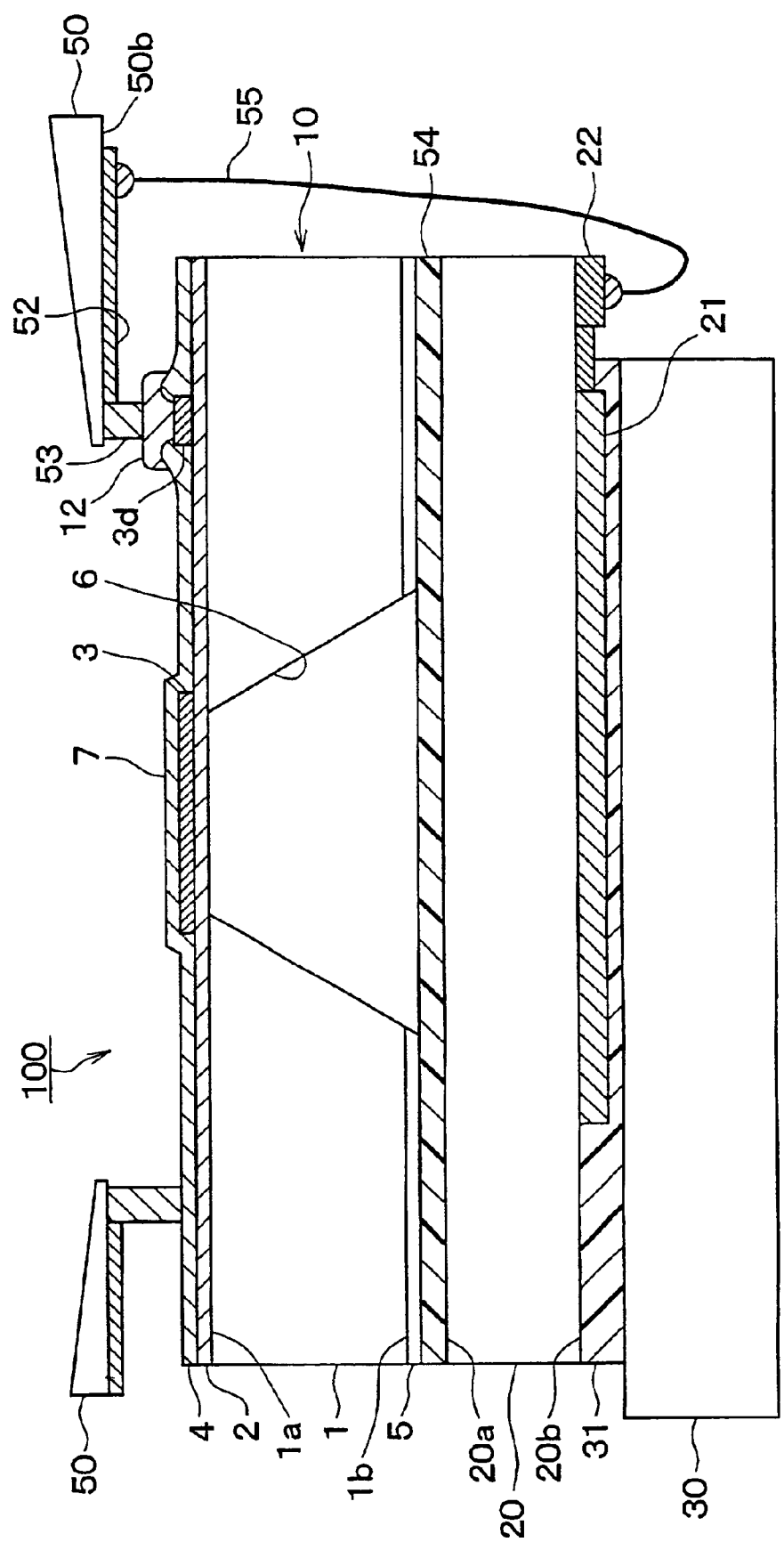
FIG. 7 is a sectional view showing a fluid flow sensor according to a fourth embodiment of the present invention.

According to this fourth embodiment, as shown in FIG. 7, the control circuit 21 is formed on the side of the rear face 20b of the circuit board 20 similar to the second embodiment. The intermediary board 50 is used similar to the third embodiment.

The intermediary board 50 is connected to the side of the surface of the sensor chip 10. The side of the rear face of the sensor chip 10 is fixed to the side of the surface 10a of the circuit board 20 via an adhesive member 54. The circuit board 20 and the base board 30 are fixed to offset. The base conductor portion 22 on the side of the rear face 20b of the circuit board 20 is exposed.

The intermediary conductor portion 52 of the intermediary board 50 and the base conductor portion 22 of the circuit board 20 are electrically connected by using a bonding wire 55. As a result, the intermediary member conductor portion 52 and the control circuit 21 are electrically connected via the bonding wire 55. The detecting portions 3a through 3c and the control circuit 21 are electrically connected. The bonding can be carried out, for example, after stacking and fixing the sensor chip 10 and the circuit board 20.

(Fifth Embodiment)

Figure 8:
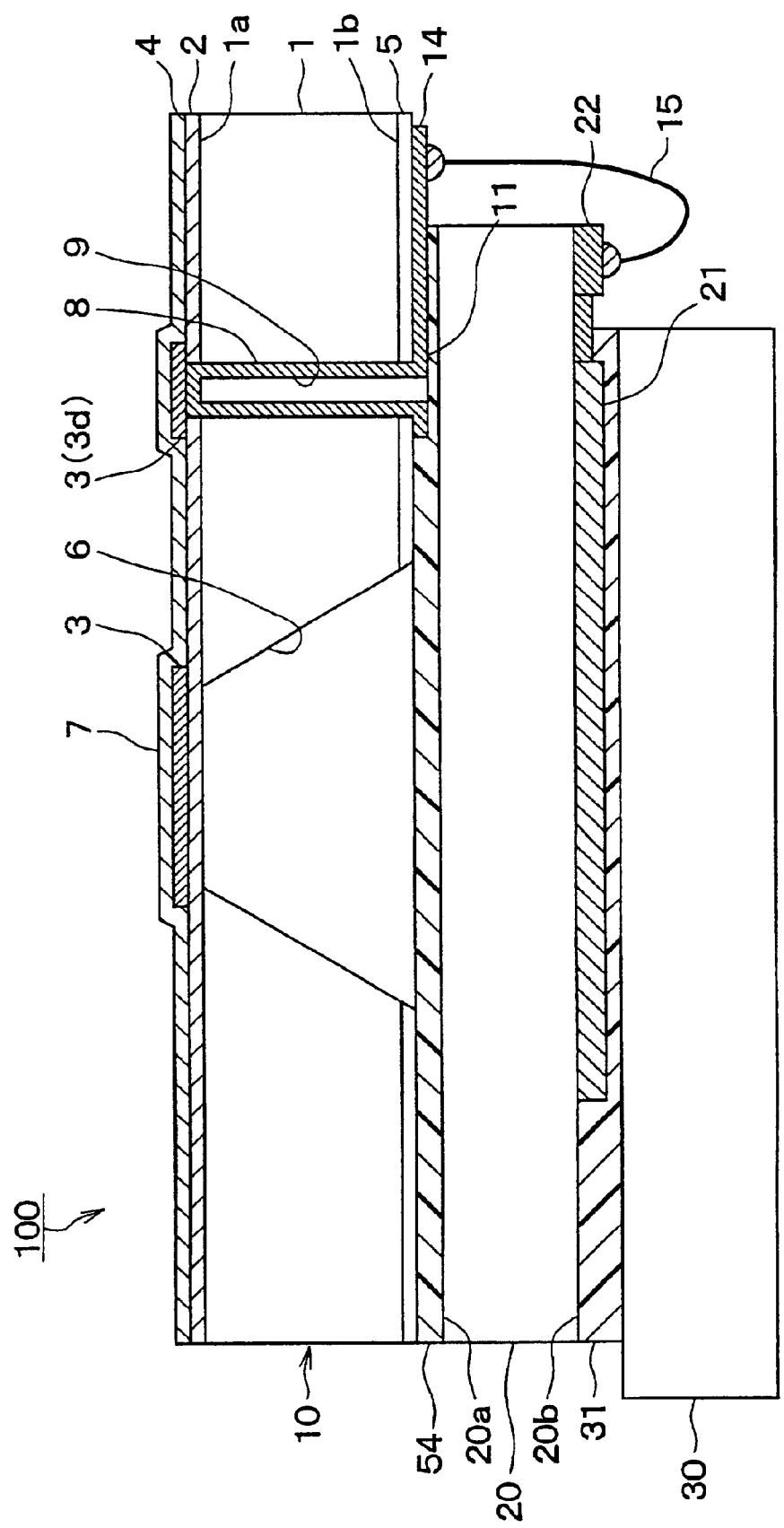
FIG. 8 is a sectional view showing a fluid flow sensor according to a fifth embodiment of the present invention.

In the fifth embodiment shown in FIG. 8, the detecting portions 3a through 3c and the control circuit 21 are connected by using a bonding wire without using the intermediary board.

As shown in FIG. 8, the sensor chip 10, the circuit board 20 and the baseboard 30 are layered to offset respectively. At the rear face 1b of the substrate 1, a wiring 14 electrically connected to the substrate conductor portion 11 is exposed, and the exposed wiring 14 is electrically connected to the base conductor portion 22 of the circuit board 20 by a bonding wire 15.

(Sixth Embodiment)

In the first embodiment, particularly in the fabricating method shown in FIGS. 3A through 3E, a semiconductor board of a silicon board or the like is used as the substrate 1. In such a case, when the conductor 9 is formed directly on the inner wall face of the through hole 8 in forming the substrate conductor portion 11, the conductor 9 and the substrate 1 are electrically and thermally connected. It is therefore likely that leakage of current is caused from the conductor 9 to the substrate 1, and a temperature distribution becomes inappropriate. This sixth embodiment shown in FIGS. 9A to 9D and FIGS. 10A and 10C reduces this likelihood.

Figure 9A:
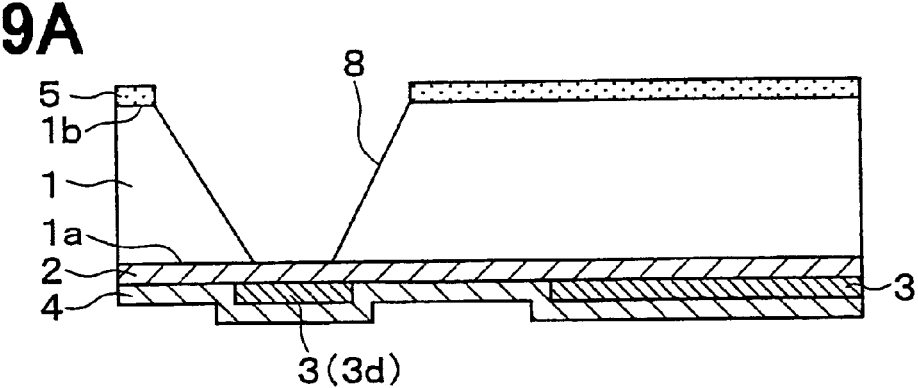
FIG. 9A through FIG. 9D are sectional views showing a part of a method of fabricating a fluid flow sensor according to a sixth embodiment of the present invention.

First, as shown in FIG. 9A, the substrate 1 comprising a semiconductor board is prepared, and the thin film layers 2, 3 and 4 are formed above the surface 1a of the substrate 1. Specifically, after forming the lower film 2 on the surface 1a of the substrate 1 comprising a silicon board or the like, the conductor film 3 comprising Pt, Ti, Ti—Ni, Ti—W, Cr or the like is formed. The heater 3a, the temperature measuring body 3b, the fluid thermometer 3c and the electrode lead-out portion 3d are formed by patterning the conductor film 3. Thereafter, the upper film 4 is formed above the conductor film 3.

Next, the through hole 8 is formed to reach the conductor film 3 in the thin film layers 2 through 4, that is, the electrode lead-out portion 3d by penetrating the substrate 1 from a portion on the side of the rear face 1b of the substrate 1 which is not formed with hollow cavity portion 6.

Specifically, the insulating film 5 comprising a silicon nitride film or the like is formed to open only at a portion which is to be formed with the through hole 8 on the side of the rear face 1b of the substrate 1. As shown in FIG. 9A, the through hole 8 is formed by carrying out etching operation by using an alkaline solution of TMAH (tetramethylammonium halide), KOH or the like until the conductor film 3 in the thin film layers 2 through 4 is exposed with the insulating film 5 as a mask.

Figure 9B:
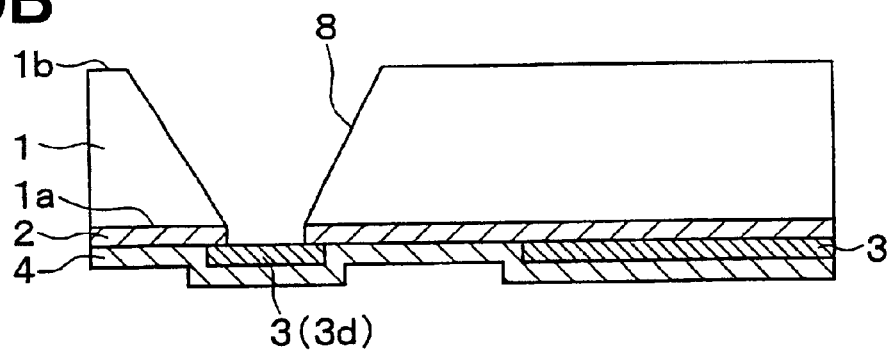
Figure 9C:
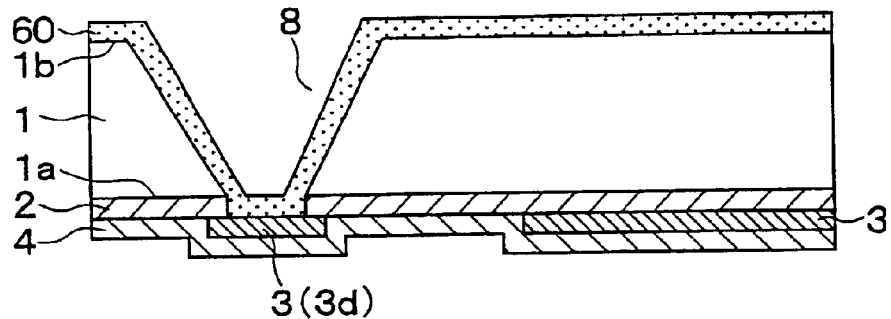
Figure 9D:
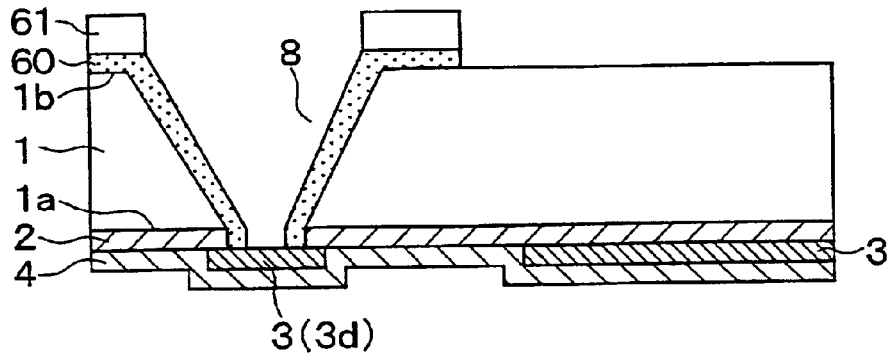

Next, as shown in FIGS. 9B, 9C and 9D, an insulating film 60 for through hole is formed at an edge portion of an opening of the through hole 8 on the side of the rear face 1b of the substrate 1 and an inner wall face of the through hole 8.

Specifically, as shown in FIG. 9B, by etching by hydrogen fluoride, the insulating film 5 and the lower film 2 exposed from the through hole 8 to the side of the rear face 1b of the substrate 1 are removed. Then, as shown in FIG. 9C, the insulating film 60 for through hole is formed over a total of the rear face 1b of the substrate 1 including the inner wall face of the through hole 8 by a sputtering process or a CVD process. The insulating film 60 comprises a silicon oxide film, a silicon nitride film or the like.

As shown in FIG. 9D, by using a photolithography process, a resist 61 is formed by patterning on the surface of the insulating film 60 for through hole and an unnecessary portion of the insulating film 60 for through hole is etched and removed with the resist 61 as a mask. Thereby, the insulating film 60 for through hole is formed at the edge portion of the opening of the through hole 8 on the side of the rear face 1b of the substrate 1 and the inner wall face of the through hole 8.

Figure 10A:
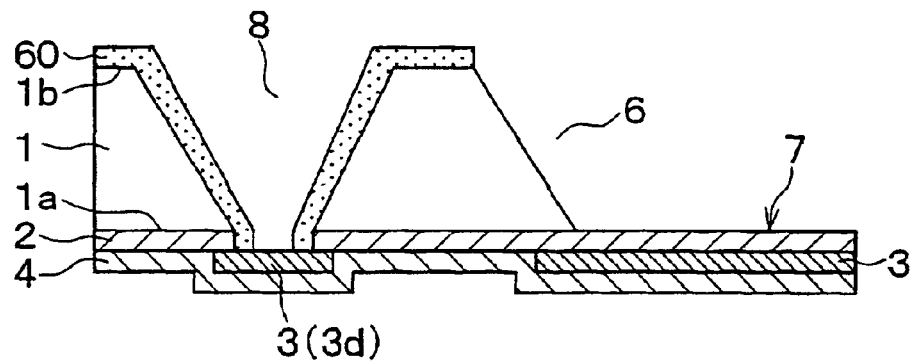
FIG. 10A through FIG. 10C are sectional views showing another part of the method of fabricating the fluid flow sensor according to the sixth embodiment.

Next, as shown in FIG. 10A, the hollow cavity portion 6 is formed by carrying out etching operation while leaving the thin film layers 2 through 4 from the side of the rear face 1b of the substrate 1, and the thin film portion 7 is formed on the hollow cavity portion 6.

Specifically, after removing the resist 61, the hollow cavity portion 6 is formed by carrying out anisotropic etching by using an alkaline solution of TMAH or KOH with the insulating film 60 for through hole comprising a silicon oxide film or a silicon nitride film as a mask.

Figure 10B:
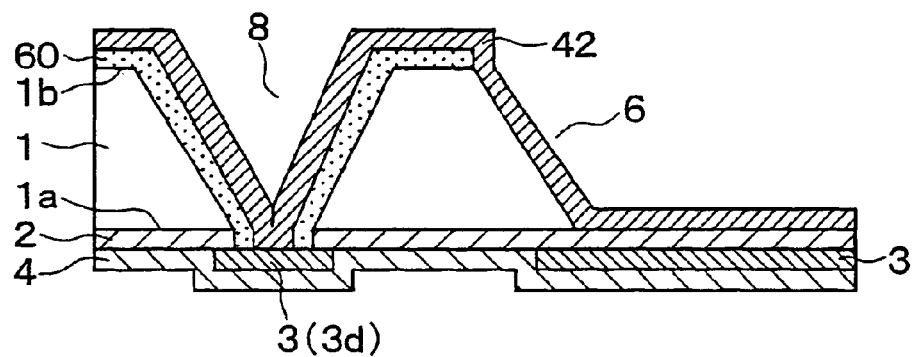
Figure 10C:
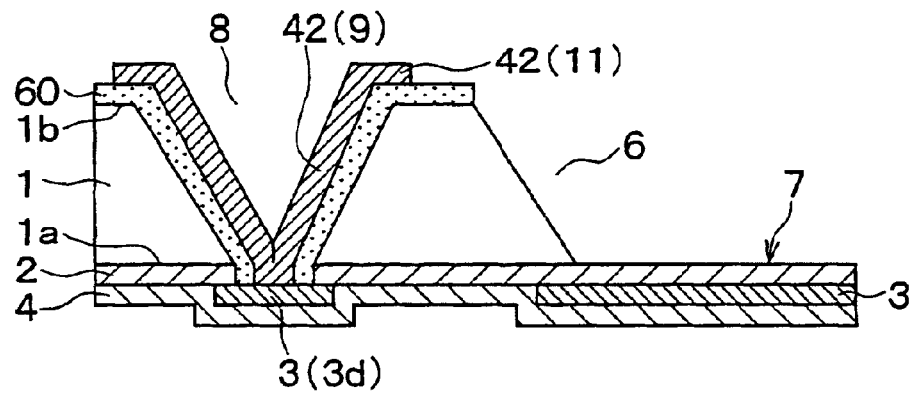

Next, as shown in FIGS. 10B and 10C, the base conductor portion 11 is formed on the side of the rear face 1b of the substrate 1 by forming a conductor 42 constituting a conductor film for through hole at the surface of the insulating film 60 for through hole to be brought into contact with the conductor film 3 of the thin film layers 2 through 4 via the through hole 8 from the side of the rear face 1b of the substrate 1. Hereinafter, the conductor 42 is referred to as the conductor film 42.

Specifically, as shown in FIG. 10B, the conductor film 42 for through hole comprising a conductor film of Au, Ti or the like is formed by using a sputtering process, a CVD process, a vapor deposition process or the like from the side of the rear face 1b of the substrate 1. Successively, as shown in FIG. 10C, the conductor film 42 for through hole is patterned by etching, a lift off process or the like using a photolithography process. By the patterning, the conductor film 42 for through hole is brought into contact with the conductor film 3 (3d) via the through hole 8 and is formed on the surface of the insulating film 60 for through hole.

In this way, the conductor film 42 for through hole disposed at the edge portion of the opening of the through hole 8 on the side of the rear face 1b of the substrate 1 is formed as the substrate conductor portion 11. The substrate conductor portion 11 is electrically connected to the electrode lead-out portion 3d via the conductor 9 at inside of the through hole 8. As a result, the substrate conductor portion 11 is electrically connected to the detecting portions 3a through 3c.

Thereafter, also in the sixth embodiment, similar to the first embodiment shown in FIG. 3E, the substrate conductor portion 11 and the base conductor portion 22 are electrically connected via the bump 23. Thereafter, the base board 30 is prepared, and the side of the rear face 20b of the circuit board 20 is fixed to the base board 30 by the adhesive member 31.

According to the sixth embodiment, the insulating film 60 for through hole is interposed between the substrate 1 and the conductor 9 and the substrate conductor portion 11, that is, between the substrate 1 and the conductor film 42 for through hole. Accordingly, electrical and thermal insulation between the substrate 1 and the conductor film 42 for through hole can be maintained. Therefore, it is less likely that leakage of current is caused from the conductor film 42 for through hole to the substrate 1 or the temperature distribution becomes inappropriate.

(Seventh Embodiment)

In the seventh embodiment shown in FIG. 11, the both boards 10 and 20 are arranged in parallel substantially on the same plane.

The fluid flow sensor chip 10 shown in FIG. 11 is the same as the fluid flow sensor chip 10 shown in FIG. 1. The thin film layers comprising the conductor film and the insulating film are formed on the surface 1a of the substrate 1, and the detecting portion for detecting a flow rate of fluid flowing above the surface 1a of the substrate 1 is formed. Further, the thin film portion 7 comprising the thin film layers is formed above the hollow cavity portion 6 formed from the side of the rear face 1b of the substrate 1 while leaving the thin film layers and the substrate conductor portion 11 electrically connected to the detecting portion is formed on the rear face 1b of the substrate 1.

In FIG. 11, the thin film layers and the conductor film and the insulating films constituting the thin film layers and the detecting portion are not illustrated. However, even in this embodiment, the sensor chip 10 has the thin film layers 2 through 4, the conductor film 3, the insulating films 2 and 4 constituting the thin film layers 2 through 4 as well as the detecting portions 3a through 3c and the electrode lead-out portion 3d, which are shown in FIG. 1.

The circuit board 20 constituting the base is formed with the control circuit 21 for controlling the detecting portion at the surface 20a similar to, for example, the circuit board 20 shown in FIG. 1.

The fluid flow sensor chip 10 and the circuit board 20 are mounted above one face of the base board 30. The base board 30 comprises ceramic or the like and one face thereof is formed with a base board conductor portion 32 comprising a conductive material of Au, Cu or the like.

The fluid flow sensor chip 10 is fixed on the one face of the base board 30 at the rear face 1b on the side of the substrate 1 opposed to the surface 1a. Specifically, the substrate conductor portion 11 formed on the rear face 1b of the substrate 1 in the fluid flow sensor chip 10 and the base board conductor portion 32 are mechanically and electrically connected via the bump 23 comprising Au or the like.

Meanwhile, the circuit board 20 is fixed onto the one face of the base board 30 on the side of the rear face 20b by adhesive or the like. The control circuit 21 disposed on the surface 20a of the circuit board 20 and the base board conductor portion 32 are electrically connected via a bonding wire 16 of Au, Al or the like formed by wire bonding.

A partition wall 110 is provided for partitioning flow of fluid between the fluid flow sensor chip 10 and the circuit board 20 on the one face of the base board 30 in order to prevent the control circuit 21 from being exposed to the fluid. The partition wall 110 is fixed onto the one face of the base board 30 by adhesive or the like.

The base board conductor portion 32 is formed on the one face of the base 30 from the side of the fluid flow sensor chip 10 to the side of the circuit board 20 by passing the lower side of the partition wall 110. Thereby, on the one face of the base board 30, the substrate conductor portion 11 and the control circuit 21 are electrically connected via the base board conductor portion 32 and the bonding wire 16.

According to the fluid flow sensor shown in FIG. 11, the fluid flows above the surface 1a of the substrate 1 along a direction orthogonal to the paper face in FIG. 11. The circuit board 20 partitioned by the partition wall 110 is not exposed to the flow of the fluid.

According to this seventh embodiment, the substrate conductor portion 11 is formed on the rear face 1b other than the surface 1a of the substrate 1. Therefore, the connecting portion of the control circuit 21 and the detecting portions 3a through 3c can be prevented from being exposed to the fluid flowing above the detecting portions 3a through 3c disposed at the surface 1a of the substrate 1.

By providing the partition wall 110 between the fluid flow sensor chip 10 and the circuit board 20, the control circuit 21 in the circuit board 20 is not exposed to the flow of the fluid. The partition wall 110 is not provided on the surface of the substrate of the fluid flow sensor chip 10.

That is, the fluid flow sensor chip 10 is electrically connected to the control circuit 21 via the substrate conductor portion 11 of the rear face 1b of the substrate 1. Therefore, the detecting portion is not provided at one side of the partition wall. A portion for carrying out transmission and reception of electric signals between outside and the detecting portion is not provided on other side thereof with the partition wall provided at the surface of the board as a boundary. Therefore, it is not necessary to enlarge the planar size of the substrate 1.

In this way, according to the seventh embodiment, the partition wall 110 need not be provided at the surface 1a of the substrate 1 constituting the fluid flow sensor chip 10.

Next, FIG. 12 shows a modification of the seventh embodiment, particularly a modification of electric connection between the control circuit 21 and the base board conductor portion 32 in the circuit board 20.

In the example shown in FIG. 12, the control circuit 21 is formed on the surface 20a of the circuit board 20, and the circuit board 20 is fixed onto one face of the base board 30 at the rear face 20b on the side opposed to the surface 20a. The control circuit 21 and the base board conductor portion 32 are electrically connected via the through hole 24 provided to penetrate from the surface 20a of the circuit board 20 to the rear face 20b.

A construction similar to the through hole 24 of the circuit board 20 shown in FIG. 4 can be adopted for the through hole 24 of the circuit board 20. By providing the conductor at inside of the through hole 24, conduction between the surface 20a and the rear face 20b of the circuit board 20 can be achieved. The conductor at inside of the through hole 24 of the circuit board 20 and the base board conductor portion 32 can be connected by the bump 33.

(Eighth Embodiment)

Figure 13:
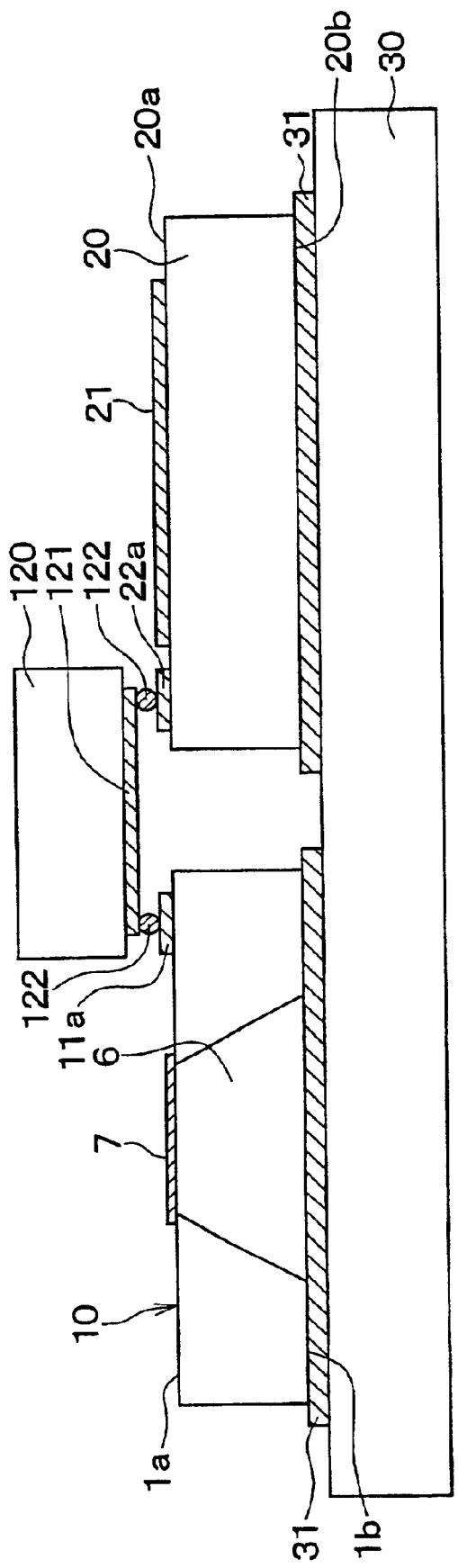
FIG. 13 is a sectional view showing a fluid flow sensor according to an eighth embodiment of the present invention.

In the eighth embodiment shown in FIG. 13, the sensor chip 10 and board 20 are provided in parallel in a manner similar to the seventh embodiment. Further, similar to the first embodiment shown in FIG. 1, the fluid flow sensor chip 10 shown in FIG. 13 is formed with the thin film layers 2 through 4 comprising the conductor film 3 and the insulating films 2 and on the surface 1a of the substrate 1. The chip 10 is formed with the detecting portions 3a through 3c for detecting a flow rate of fluid flowing above the surface 1a of the substrate 1 by the conductive film 3 and formed with the thin film portion 7 comprising the thin film layers 2 through 4 above the hollow cavity portion 6 formed from the side of the rear face 1b of the substrate 1 while leaving the thin film layers 2 through 4.

Here, the sensor chip 10 of FIG. 13 is formed with a substrate conductor portion 11a electrically connected to the detecting portions 3a through 3c. The substrate conductor portion 11a formed there can be constituted, for example, by a conductor film of Au, Al or the like formed on the surface of the electrode lead-out portion 3d in FIG. 2. The conductor film can be connected to the electrode lead-out portion 3d by forming a contact hole at the upper film 4 of the thin film layers 2 through 4.

Meanwhile, the circuit board 20 shown in FIG. 13 is formed with the control circuit 21 and a base conductor portion 22a conducted to the control circuit 21. The base board 30 shown in FIG. 13 is not formed with the base board conductor portion at a face thereof mounted with the fluid flow sensor chip 10 and the circuit board 20.

The fluid flow sensor chip 10 is fixedly attached onto the one face of the base board 30 at the rear face 1b of the substrate 1 via the adhesive member 31, and the circuit board 20 is fixedly connected onto the one face of the base board 30 at the rear face 20b via the adhesive member 31.

As shown in FIG. 13, there is bridged a connecting member 120 for electrically connecting the substrate conductor portion 11a and the control circuit 21. The connecting member 120 comprises a silicon board or the like, the planar size thereof being smaller than that of the substrate 1 and the thickness thereof being equivalent or smaller than the thickness of the substrate 1. The rear face of the connecting member 120 is formed with a connecting member conductor portion 121 comprising a conductive material of Au, Ni or the like.

As shown in FIG. 13, the substrate conductor portion 11a is covered with the connecting member 120. Further, the base conductor portion constituting an electric connecting portion between the control circuit 21 and the connecting member 120 is covered. The connecting conductor portion 120 and the substrate conductor portion 11a as well as the connecting conductor portion 120 and the base conductor portion 22a are electrically and mechanically connected by bumps 122 comprising Au or the like.

According to the fluid flow sensor shown in FIG. 13, fluid flows above the surface 1a of the substrate 1 along a direction orthogonal to the paper face in FIG. 13. The electric connecting portions such as the substrate conductor portion 11a and the base conductor portion 22a covered with the connecting member 120 are prevented from being exposed to the flow of the fluid.

According to the connecting member 120, the planar size is smaller than that of the substrate 1 and the thickness is equivalent to or smaller than the thickness of the substrate 1. Therefore, the flow of the fluid is hardly disturbed. Therefore, it is not necessary to enlarge a distance between the detecting portions 3a through 3c and the connecting member 120 in the fluid flow sensor chip 10.

(Ninth Embodiment)

Figure 14A:
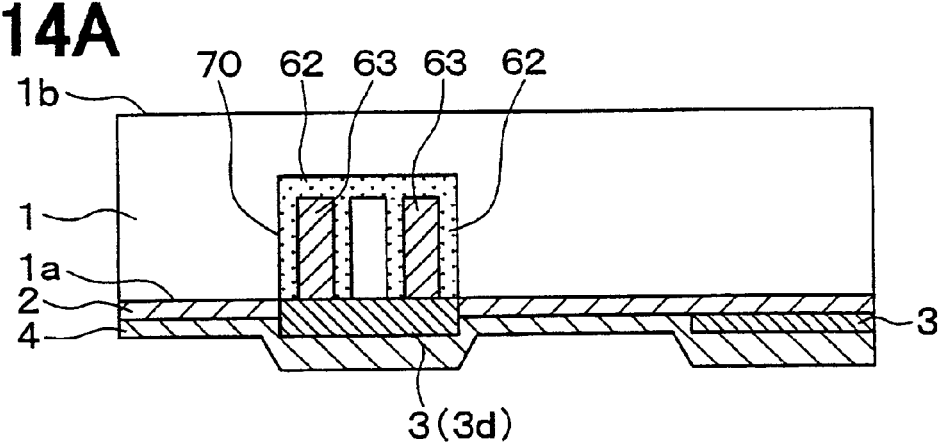
FIG. 14A through FIG. 14C are sectional views showing a part of a method of fabricating a fluid flow sensor according to a ninth embodiment of the present invention.
Figure 14B:
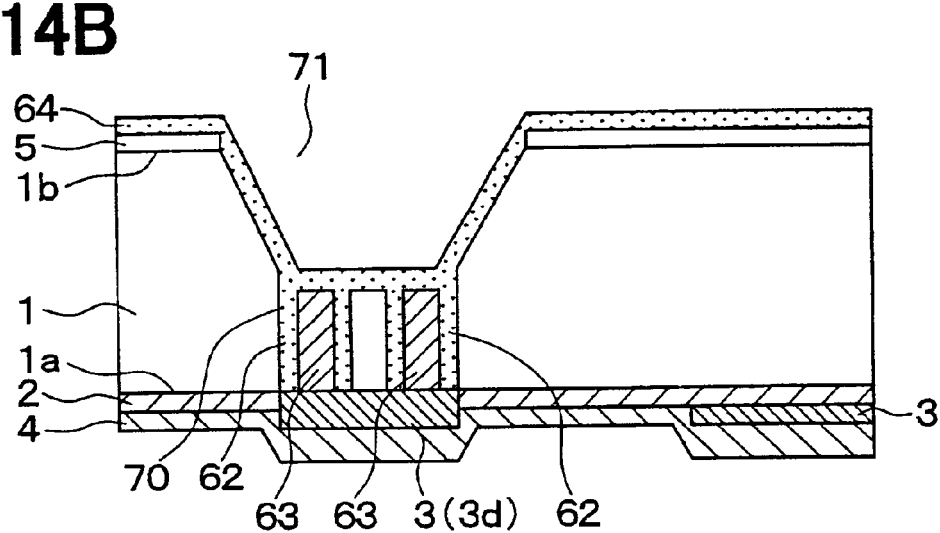
Figure 14C:
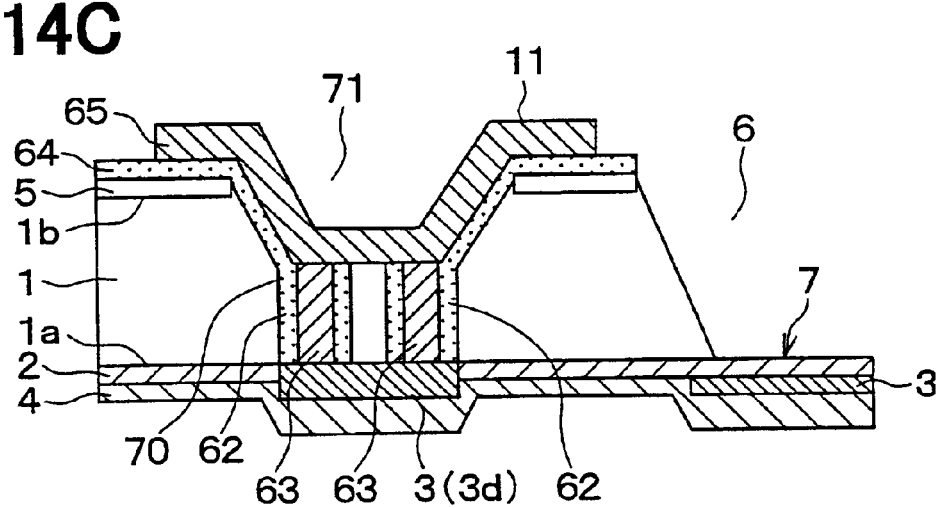

The ninth embodiment is directed to protect the substrate from being damaged or broken due to a thin layered film structure layered with the insulating films and the conductor film. The manufacturing method of the ninth embodiment is shown in FIGS. 14A to 14C.

First, the substrate 1 is prepared, and a trench 70 having a predetermined depth is formed at a portion of the substrate 1 which is not formed with the hollow cavity portion 6 from the side of the surface 1a of the substrate 1.

Specifically, the lower film 2 for constituting the thin film layers 2 through 4 at the surface 1a of the substrate 1 and the lower film 2 disposed at a portion which is to be formed with the trench 70 is removed by etching or the like. Successively, the trench 70 is formed by carrying out trench etching of RIE (reactive ion etching) or the like from the surface 1a of the substrate 1 with the lower film 2 as a mask.

Next, an insulating film 62 is formed on an inner wall face of the trench 70. Specifically, the insulating film 62 can be formed by thermal oxidation or the like. Next, a conductor 63 for trench is embedded at inside of the trench 70 formed with the insulating film 62. Specifically, the conductor 63 can be embedded by a sputtering process, a CVD process, a vapor deposition process or the like by using polycrystal silicon, Au, Al or the like.

The thin film layers 2 through 4 are formed on the surface 1a of the substrate 1 so that the detecting portions 3a through 3c and the conductor 63 are electrically connected. Specifically, the lower film 2 is formed except that of the portion of the trench 70. Therefore, the detecting portions 3a through 3c and the electrode lead-out portion 3d conducted thereto are formed by forming to pattern the conductor film 3 thereon.

Here, the electrode lead-out portion 3d is formed at the portion of the trench 70, the electrode lead-out portion 3d and the conductor 63 for trench are electrically connected. As a result, the detecting portions 3a through 3c and the conductor 63 for trench are electrically connected. By forming the upper film 4, the thin film layers 2 through 4 are formed at the surface 1a of the substrate 1.

Next, an opening portion 71 reaching a bottom portion of the trench 70 is formed by carrying out etching from the side of the rear face 1b of the substrate 1.

Specifically, the insulating film 5 is formed so that an area of the rear face 1b of the substrate 1 corresponding to the trench 70 is opened. The insulating film 5 can be formed to pattern by forming a silicon nitride film or the like and carrying out etching using the photolithography technology.

Next, the opening portion 71 is formed by carrying out anisotropic etching by using an alkaline solution of TMAH, KOH or the like until the insulating film 62 and the conductor 63 for trench at inside of the trench 70 are exposed with the insulating film 5 as a mask.

Successively, an insulating film 64 for opening portion is formed at an edge portion of the opening of the opening portion 71 on the side of the rear face 1b of the substrate 1 and the inner wall face of the opening portion 71. Specifically, the insulating film 64 for opening portion is formed by forming a silicon oxide film or the like by a sputtering process, a CVD process or the like.

Similar to FIG. 9D, an unnecessary portion of the insulating film 64 for opening portion is etched to remove along with the insulating film 5 by etching by hydrogen fluoride or the like using the photolithography process.

In this occasion, the insulating film 64 for opening portion disposed at the bottom portion of the opening portion 71 opened to the side of the rear face 1b of the substrate 1 is selectively removed, and the conductor 63 for trench is exposed to the side of the rear face 1b of the substrate 1. The insulating film 5 and the insulating film 64 for opening portion are patterned to open a portion to be formed with the hollow cavity portion 6.

Next, the hollow cavity portion 6 is formed by carrying out etching from the side of the rear face 1b of the substrate 1 while leaving the thin film layers 2 through 4, and the thin film portion 7 is formed above the hollow cavity portion 6.

Specifically, the hollow cavity portion 6 is formed by carrying out anisotropic etching using an alkaline solution of TMAH or KOH or the like by constituting a mask by the insulating film 5 and the insulating film 64 for opening portion which have been patterned to open the portion to be formed with the hollow cavity portion 6.

Next, the substrate conductor portion 11 is formed from the side of the rear face 1b of the substrate 1 by forming a conductor 65 for opening portion at a surface of the insulating film 64 to be brought into contact with the conductor 63 for trench via the opening portion 71 from the side of the rear face 1b of the substrate 1.

Specifically, the conductor film 65 comprising a conductor film of Au, Ti or the like is formed from the side of the rear face 1b of the substrate 1 by using a sputtering process, a CVD process, a vapor deposition process or the like. The conductor film 65 is patterned by etching using a photolithography process or a lift off process or the like. Thereby, the conductor film 65 for opening portion is formed in a shape brought into contact with the conductor film 63 for trench via the opening portion 71 and formed on the surface of the insulating film 64.

In this way, the conductor film 65 disposed at the edge portion of the opening of the opening portion 71 on the side of the rear face 1b of the substrate 1 as the substrate conductor portion 11. The substrate conductor portion 11 is electrically connected to the electrode lead-out portion 3d via the conductor film 65 at inside of the opening portion 71 and the conductor 63 for trench at inside of the trench 70. As a result, it is electrically connected to the detecting portions 3a through 3c.

Thereafter, also in the ninth embodiment, by connecting the fluid flow sensor chip 10 to the circuit board 20 via the substrate conductor portion 11 and mounting the circuit board 20 to the base board 30, the fluid flow sensor 100 can be completed.

According to the fabricating method, by previously forming the trench of a certain degree of depth from the surface 1a of the substrate 1 and embedding the trench 70 by the conductor 63 for trench, a sufficient thickness is ensured and mechanical strength is also ensured. Therefore, destruction of the substrate 1 can be restrained in fabricating or using the substrate 1.

In the fabricating method of the ninth embodiment, etching for forming the opening portion 71 from the side of the rear face 1b of the substrate 1 and etching for forming the hollow cavity portion 6 may simultaneously be carried out. Thereby, simplification of steps can be achieved.

Specifically, in forming the insulating film 5 constituting the mask for forming the opening portion 71 at the rear face 1b of the substrate 1, at the insulating film 5, the insulating film 5 is formed to pattern to open the area corresponding to the trench 70 and the portion to be formed with the hollow cavity portion 6.

The opening portion 71 and the hollow cavity portion 6 can simultaneously be formed by carrying out anisotropic etching using an alkaline solution of TMAH, KOH or the like with the insulating film 5 as the mask.

With regard to forming the insulating film 64 and the conductor film 65, which is carried out at a later step, the films can selectively be formed by using normal photolithography process, etching technology, lift off process or the like, and the structure shown in FIG. 14C can similarly be formed.

(Tenth Embodiment)

According to the method of forming the through hole 8 as shown in FIGS. 3A through 3E, FIGS. 9A through 9D and FIGS. 10A through 10C, the semiconductor board is used as the substrate 1. The substrate 1 is penetrated from the side of the rear face 1b of the substrate 1 by single operation of anisotropic etching. In this case, the inner wall face of the through hole 8 formed by the anisotropic etching is formed in a tapered shape widening toward the side of the rear face 1b of the substrate 1 as shown in FIGS. 9A through 9D.

Therefore, the opening area of the through hole 8 is enlarged. As a result, a space occupied at the substrate 1 by the substrate conductor portion 11 is also enlarged. Therefore, the large space is not preferable for further promoting small-sized formation of the substrate 1 and accordingly of the fluid flow sensor chip 10. The tenth embodiment provides a fabrication method as a measure for resolving such a problem.

Figure 15A:
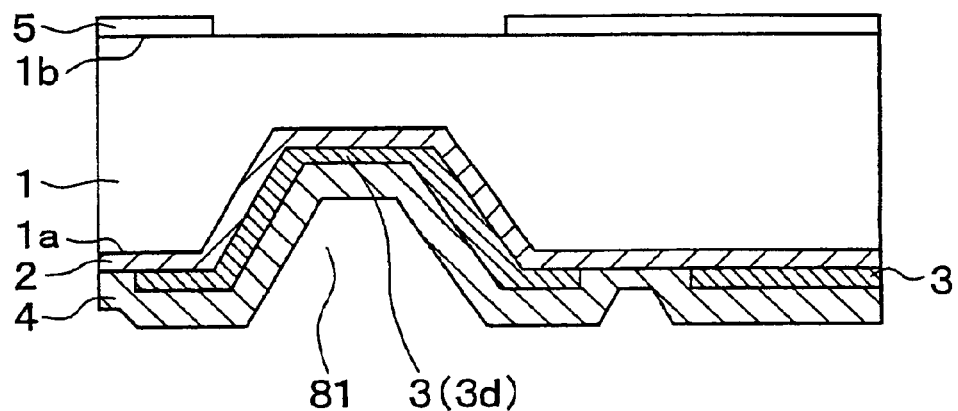
FIG. 15A and FIG. 15B are sectional views showing a part of a method of fabricating a fluid flow sensor according to a tenth embodiment of the present invention.
Figure 15B:
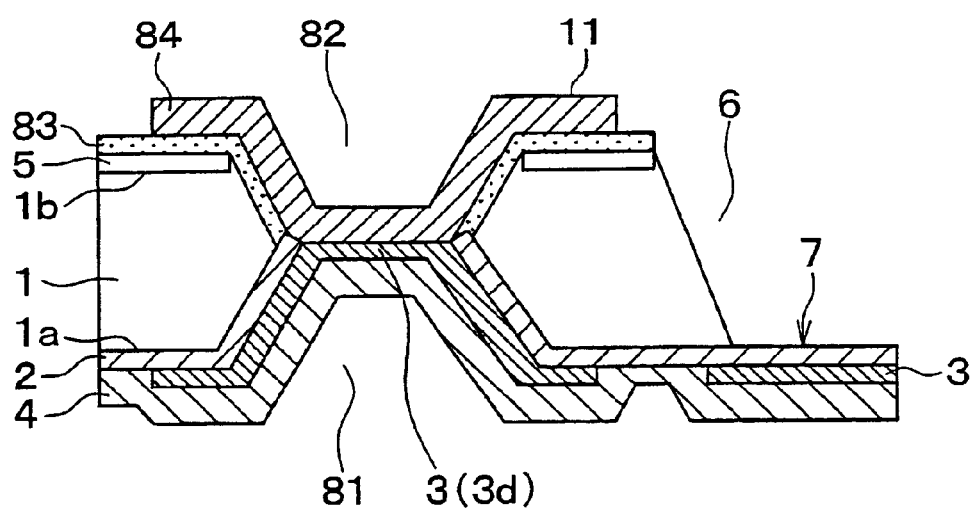

First, as shown in FIG. 15A, the substrate 1 is prepared, and a first opening portion 81 of a predetermined depth is formed at a portion of the substrate 1 which is not formed with the hollow cavity portion 6 by carrying out anisotropic etching from the side of the surface 1a of the substrate 1.

Specifically, the first opening portion 81 is formed by carrying out anisotropic etching using an alkaline solution of TMAH, KOH or the like by masking a portion other than a portion to be etched.

Next, the thin film layers 2 through 4 are formed at the surface 1a of the substrate 1 including the inner wall face of the first opening portion 81. In this occasion, according to the example shown in FIG. 15A, the electrode lead-out portion 3d in the conductor film 3 constituting the thin film layers is formed on the inner wall face of the first opening portion 81.

Next, the insulating film 5 is formed as a mask for forming a second opening portion 82. The insulating film 5 is provided with a shape in which an area of the rear face 1b of the substrate 1 corresponding to the first opening portion 81 is opened and can be formed to pattern by forming a silicon nitride film or the like and carrying out etching using the photolithography technology.

Next, the second opening portion 82 is formed to penetrate to the first opening portion 81 by carrying out anisotropic etching from the side of the rear face 1b of the substrate 1.

Specifically, the second opening portion 82 is formed by carrying out anisotropic etching using an alkaline solution of TMAH, KOH or the like to expose the lower film 2 of the thin film layers 2 through 4 at inside of the first opening portion 81 by constituting a mask by the insulating film 5.

Next, an insulating film 83 for second opening portion is formed at an edge portion of an opening of the second opening portion 82 on the side of the rear face 1b of the substrate 1 and an inner wall face of the second opening portion 82. Specifically, the insulating film 83 for second opening is formed by forming a silicon oxide film or the like by a sputtering process, a CVD process or the like.

An unnecessary portion of the insulating film 83 is removed by etching along with the insulating film 5 by etching by hydrogen fluoride or the like using the photolithography process or the like.

At this occasion, the insulating film 83 disposed at the bottom portion of the second opening portion 82 opening to the side of the rear face 1b of the substrate 1 and the lower film 2 of the thin film layers 2 through 4 are selectively removed. The conductor film 3 of the thin film layer is exposed to the side of the rear face 1b of the substrate 1. The insulating film 5 and the insulating film 83 for second opening portion are patterned to open a portion to be formed with the hollow cavity portion 6.

Next, the hollow cavity portion 6 is formed by carrying out anisotropic etching from the side of the rear face 1b of the substrate 1 while leaving the thin film layers 2 through 4. The thin film portion 7 is formed on the hollow cavity portion 6.

Specifically, the hollow cavity portion 6 is formed by carrying out anisotropic etching using an alkaline solution of TMAH, KOH or the like by constituting a mask by the insulating film 5 and the insulating film 83 for second opening portion which are patterned to open the portion to be formed with the hollow cavity portion 6.

Next, by forming a conductor 84 at a surface of the insulating film 83 to be brought into contact with the conductor film 3 (electrode lead-out portion 3d) of the thin film layers 2 through 4 from the side of the rear face 1b of the substrate 1 via the second opening portion 82, the substrate conductor portion 11 is formed on the side of the rear face 1b of the substrate 1.

Specifically, the conductor film 84 comprising a conductor film of Au, Ti or the like is formed from the side of the rear face 1b of the substrate 1 by using a sputtering process, a CVD process, a vapor deposition process or the like. The conductor film 84 is patterned by etching by using the photolithography process or a lift off process or the like. Thereby, the conductor film 84 for second opening portion is formed in a shape brought into contact with the conductor film 3 (3d) via the second opening portion 82 and formed at a surface of the insulating film 83 for second opening portion.

In this way, the conductor film 84 disposed at an edge portion of an opening of the second opening portion 82 is formed on the side of the rear face 1b of the substrate 1 as the substrate conductor portion 11. The substrate conductor portion 11 is electrically connected to the electrode lead-out portion 3d via the conductor film 84 at inside of the second opening portion 82 and as a result, electrically connected to the detecting portions 3a through 3c.

Thereafter, also in the tenth embodiment, the fluid flow sensor 100 can be completed by connecting the fluid flow sensor chip 10 to the circuit board 20 via the substrate conductor portion 11 and mounting the circuit board 20 to the base board 30.

According to this fabricating method, the first opening portion 81 of a certain degree of depth is previously formed from the surface 1a of the substrate 1 by anisotropic etching. Successively, the second opening portion 82 is formed from the rear face 1b of the substrate 1 by anisotropic etching, and the first and the second opening portions 81 and 82 are communicated with each other.

Opening areas of the respective first and second opening portions 81 and 82 can be made smaller than an opening area of a through hole formed by penetrating the substrate 1 from the side of the rear face 1b of the substrate 1 by single operation of anisotropic etching. As a result, the area necessary for the substrate conductor portion 11 is reduced.

According to the fabricating method of the tenth embodiment, anisotropic etching for forming the second opening portion 82 from the side of the rear face 1b of the substrate 1 and the anisotropic etching for forming the hollow cavity portion 6 may simultaneously be carried out. Thereby, simplification of steps can be achieved. Specifically, the anisotropic etching can be carried out in conformity with the method of simultaneously etching the opening portion and the hollow cavity portion according to the ninth embodiment.

(Eleventh Embodiment)

In the above embodiments, the substrate conductor portion 11 can be formed from the side of the rear face 1b of the substrate 1. That is, the respective through holes 8 can also be arranged in one row in a direction orthogonal to a direction of extending the lead portion. However, when the through holes 8 are formed by anisotropic etching, as described at beginning of the tenth embodiment, the opening area is large. Therefore, there is a limit in arranging a plurality of the through holes 8 in view of space thereof. In this case, when the thickness of the substrate 1 is thinned, the opening area of the through hole 8 can also be reduced. However, the strength of the substrate 1 is lowered.

Figure 16:
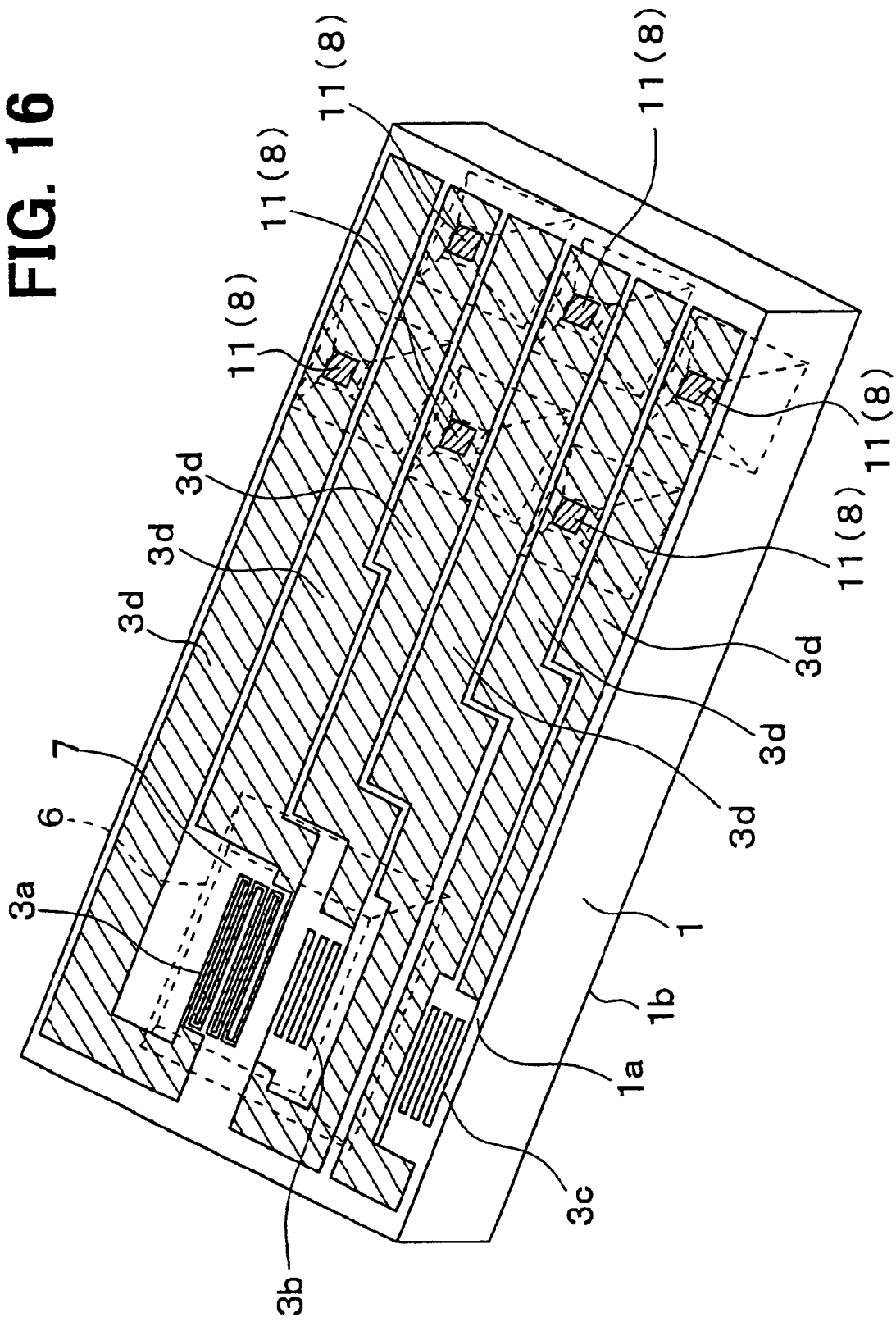
FIG. 16 is a sectional view showing a fluid flow sensor chip according to an eleventh embodiment of the present invention.

The eleventh embodiment provides a fluid flow sensor, which is constructed as shown in FIG. 16 to overcome the above problem. As shown in FIG. 16, the detecting portions 3a through 3c for detecting a flow rate of a fluid flowing above the surface 1a of the substrate 1 is formed on the surface 1a of the substrate 1. On the surface 1a of the substrate 1, the electrode lead-out portions 3d are formed as a plurality of pieces of lead portions electrically connected to the detecting portions 3a through 3c to extend from the detecting portions 3a through 3c toward a peripheral portion at an end side of the substrate 1.

A plurality of pieces of the substrate conductor portions 11 corresponding to the plurality of pieces of electrode lead-out portions 3d is formed on the rear face 1b of the substrate 1. Here, the through holes 8 are formed to penetrate from the side of the rear face 1b of the substrate 1 to the side of the surface 1a of the substrate 1 by anisotropic etching at portions connecting the respective electrode lead-out portions 3d and the substrate conductor portions 11.

In this embodiment, in a manner similar to that shown in FIGS. 3A through 3E and FIGS. 10A through 10C, the through hole 8 is provided with the conductor at inside of the through hole 8. Thereby, the respective electrode lead-out portion 3d and the substrate conductor portion 11 are electrically connected via the through hole 8.

In this case, as shown in FIG. 16, the respective through holes 8 are arranged alternately in the direction of extending the electrode lead-out portions 3d. That is, the respective through holes 8 are arranged not in one row in the direction orthogonal to the direction of extending the electrode lead-out portion 3d but with stepped differences thereamong.

By arranging the respective through holes 8 alternately in the direction of extending the electrode lead-out portion 3d, in comparison with the case of arranging the respective holes 8 in one row in the direction orthogonal to the direction of extending the electrode lead-out portion 3d, the respective through holes 8 can efficiently be arranged in view of space.

Therefore, according to the eleventh embodiment, it is possible to realize the constitution of the fluid flow sensor chip preferable for arranging the through holes 8, and accordingly the substrate conductor portions 11 in a limited narrow space with high density.

According to this embodiment, transmission and reception of electric signals between outside of the fluid flow sensor chip 10 and the detecting portions 3a through 3c can be carried out via the substrate conductor portions 11 on the side of the rear face 1b of the substrate 1. Therefore, the planar size of the fluid flow sensor chip 10 can be reduced similar to the first embodiment and the like.

(Other Embodiment)

In the first embodiment, a spacing between the sensor chip 10 and the circuit board 20 may be molded by an adhesive member of epoxy species or the like. Thereby, the control circuit 21 can be prevented from malfunctioning by small deposit dust in the vicinity of the control circuit 21 or by undergoing influence of the humidity.

An adhesive member of epoxy resin or the like may be filled in a gap produced between the sensor chip 10 and the portion layered with the intermediary board 50. Thereby, connection between the sensor chip 10 and the intermediary board 50 is reinforced. The control circuit 21 need not be arranged on the rear face in the vicinity of the sensor chip 10 in the intermediary board 50 but may electrically be connected to the control circuit 21 at a remote position by a bonding wire.

The substrate conductor portion 11 at the rear face 1b of the substrate 11 may electrically be connected to the control circuit 21 or other circuit by carrying out direct bonding.

Figure 17:
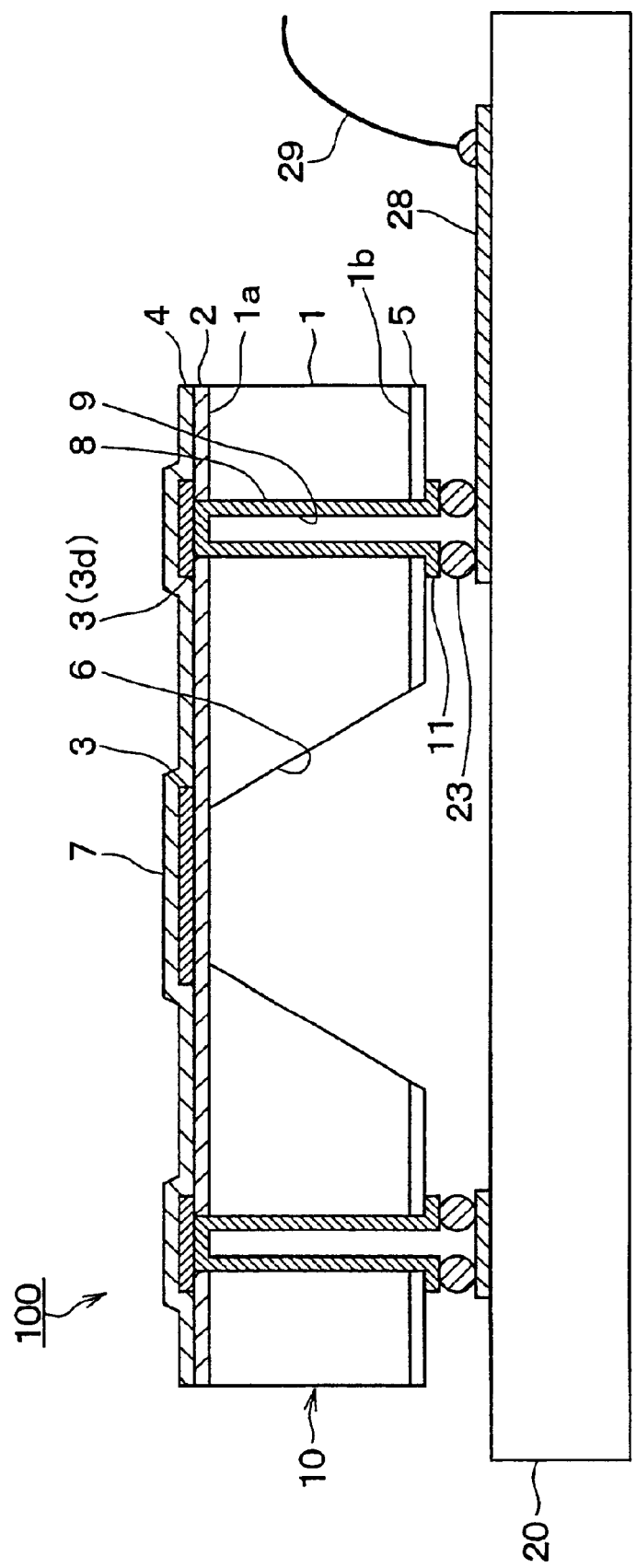
FIG. 17 is a sectional view showing a fluid flow sensor according to a twelfth embodiment of the present invention.

The substrate conductor portion 11 and the control circuit 21 may electrically be connected via a bonding wire 29 by connecting the substrate conductor portion 11 of the sensor chip 10 to an end portion of a wiring 28 above the circuit board 20 and electrically connecting the wiring 28 and the control circuit 21 by the bonding wire 29 or the like as shown in FIG. 17 without arranging the sensor chip 10 above a portion of the circuit board 20 formed with the control circuit 21.

The detecting portion 3a through 3c at the surface 1a of the substrate 1 and the substrate conductor portion 11 may electrically be connected by forming a wiring on an outer surface of the substrate 1 from the surface 1a of the substrate 1 of the sensor chip 10 to a side face thereof, further to the rear face 1b without providing the through hole 8. The substrate conductor portion 11 may be formed not on the rear face 1b of the substrate 1 but, for example, on the side face of the substrate 1, and a wiring may be formed on the outer surface of the substrate 1 from the detecting portions 3a through 3c to the substrate conductor portion 11.

A casing containing the fluid flow sensor may be utilized as the intermediary board 50 the third embodiment. That is, the control circuit 21 may be formed at an inner surface of the casing or by forming a wiring at the inner surface of the casing, the wiring may electrically be connected to the control circuit 21 arranged at a portion other than the inner surface of the casing. Thereby, a number of necessary parts of the fluid flow sensor 100 can be reduced.

Although the conductors 9 and 25 are provided at the inner wall faces of the through holes 8 and 24 in the above embodiments, the through holes 8 and 24 may be embedded with conductors. When possible, the control circuit 21 may directly be provided on the rear face 1b of the substrate 1 and may electrically be connected to the substrate conductor portion 11.

What is claimed is:

1. A fluid flow sensor comprising:
   a fluid flow sensor chip including a board having a first surface and formed with detecting portions for detecting a flow rate of a fluid flowing above the first surface of the board; and
   a base formed with a control circuit for controlling the detecting portions,
   wherein the fluid flow sensor chip is formed with a substrate conductor portion electrically connected to the detecting portions on a face of a second surface of the board other than the first surface,
   wherein the substrate conductor portion and the control circuit are electrically connected such that the control circuit is arranged on a plane different from the surface of the board, and
   wherein the control circuit is formed on a side of a first surface of the base; and the side of the first surface of the board is arranged in opposition to the second surface of the board to thereby layer the board and the base,
   and further comprising:
   a hollow cavity portion formed from the second surface of the board to the first surface of the board, and a thin film layer formed on the first surface of the board, above said hollow cavity portion, and covering said detecting portions, the substrate conductor portion being electrically connected to the detecting portions below the detecting portions.

2. The fluid flow sensor as in claim 1, wherein:
   a through hole is formed in the board;
   the substrate conductor portion is formed on the side of the second surface of the board; and
   the detecting portions and the substrate conductor portion are electrically connected via a conductor formed on an inner wall face of the through hole.

3. The fluid flow sensor as in claim 2, wherein:
   wherein the fluid flow sensor chip and the base are layered with a gap therebetween, said substrate conductor portion being electrically and structurally connected to a conductor of the base through at least one bump, said bump having conductivity, adhesive force and structural strength.

4. The fluid flow sensor as in claim 1, wherein:
   wherein the fluid flow sensor chip and the base are layered with a gap therebetween, said substrate conductor portion being electrically and structurally connected to a conductor of the base through at least one bump, said bump having conductivity, adhesive force and structural strength.

* * * * *